C. H. CHAPMAN.
PROCESS OF CONTROLLING THE THICKNESS OF WALLS IN AN ELECTRIC FURNACE.
APPLICATION FILED FEB. 20, 1917.
1,340,155. Patented May 18, 1920.
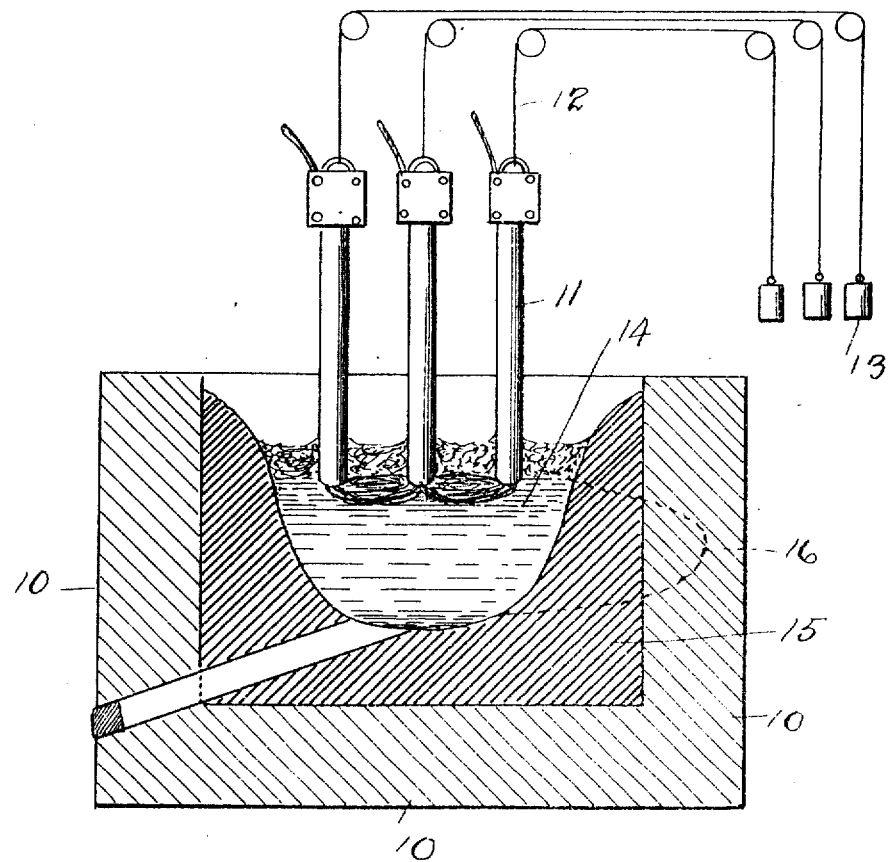
Witnesses
A. F. Mancay.
J. L. Macdermott
Inventor
Charles H. Chapman
By
Howard E. Barlow
Attorney

UNITED STATES PATENT OFFICE.

CHARLES H. CHAPMAN, OF NIAGARA FALLS, NEW YORK, ASSIGNOR TO GENERAL ABRASIVE COMPANY, INC., OF NIAGARA FALLS, NEW YORK, A CORPORATION OF NEW YORK.

PROCESS OF CONTROLLING THE THICKNESS OF WALLS IN AN ELECTRIC FURNACE.

1,340,155.

Specification of Letters Patent.

Patented May 18, 1920.

Application filed February 20, 1917. Serial No. 149,948.

*To all whom it may concern:*

Be it known that I, CHARLES H. CHAPMAN, a citizen of the United States, and resident of the city of Niagara Falls, in the county of Niagara and State of New York, have invented certain new and useful Improvements in Processes of Controlling the Thickness of Walls in an Electric Furnace, of which the following is a specification.

This invention relates to an improved method of operating an electric smelting furnace, and has for its object to provide a new and improved method of first forming the furnace lining of refractory material by fusing the charge and subsequently controlling the thickness of this lining either by regulating the rate of feeding the charge relative to the amount of melting heat applied or by regulating the heat relative to the rate of feeding the charge.

Many types of furnace walls have been used in high temperature electric furnaces. Among these may be mentioned carbon lined walls of firebrick; magnesia brick; chrome brick; silica brick; water jacketed brick walls; water jacketed metal walls; water sprayed metal walls; and various combinations of these arrangements. All of these are subject to more or less rapid deterioration in operation. The exceedingly high temperatures attained and the varying conditions in the furnace, which are sometimes highly reducing and sometimes oxidizing, combine to rapidly destroy the furnace walls, and not infrequently melt through them so that the molten charge escapes at no little danger to the operators, and expense by the loss of much material. The cost of re-lining and repairing electric furnace walls has heretofore constituted a serious item of expense in electric smelting processes. The method of constructing and operating electric furnaces which I have invented obviates all necessity for re-lining or repairing the furnace walls as it causes them to be automatically renewed so that a furnace will last indefinitely.

My invention relates more particularly to tapping or tilting furnaces of the continuous type, but I do not restrict my invention to these types as the same may be used in any other type of furnace to which it may be adapted.

With these and other objects in view, the invention consists of certain novel features as will be more fully described, and particularly pointed out in the appended claims.

In the accompanying drawing:

The figure illustrated in the drawing is a sectional side elevation showing one form of furnace by the use of which my improved process may be successfully carried out.

Referring to the drawing, 10 designates the bottom and side walls of the electric smelting furnace the walls of which may be made of firebrick or other suitable refractory material, and reinforced on the outside by means of metal bands or other suitable devices. Any desired number of electrodes 11 may be employed to carry the electric current into the furnace for melting the charge. These may be supported on wire cables 12 and counter balanced by weights 13 so that they can be raised or lowered as needed to regulate the amount of current passing through the charge. 14 designates that portion of the charge which is in a molten state and 15 that part of the charge which has previously been melted but has flowed away from the molten zone in the immediate vicinity of the electrodes to a position where the temperature is insufficient to keep it molten and where it has hardened, so forming a solid, unbroken, continuous inner wall or lining of highly refractory material like lava, which serves to protect both the sides and the bottom of the brick walls of the furnace from action of the excessive heat and so prolongs the life of the furnace indefinitely.

My improved method of forming a lining of refractory material, is as follows:—

After the first or outer walls of the furnace have been built a thick layer of the charge is placed inside. The heat is then applied and raised sufficiently to melt nearly the whole mass of granular charge leaving a comparatively thin layer of unfused material next to the brick as a protector therefor. The temperature is now lowered so that that portion of the molten charge removed from the vicinity of the electrodes; cools into a solid crystalline highly refractory shell, which is much more refractory than the granular charge from which it was formed, thereby providing a solid unbroken continuous highly refractory lining for the furnace that can be obtained only in the manner above described.

In the operation of an electric smelting furnace it is customary and desirable to keep the amount of current passing through it nearly constant and this is accomplished by raising or lowering the electrodes to compensate for the varying depth of the charge fed at intervals thereto. The amount of head added to the charge per unit of time is therefore approximately uniform. It therefore follows that if no additional charge be added for a considerable period of time the melted part of the charge 14 will take up all the heat and become continually hotter. Some of this heat travels by radiation and conduction from 14 into the outlying strata 15 which may be that previously melted and subsequently cooled or it may be part of an original unmelted charge and the temperature of this molten body acts upon and melts the walls with which it contacts thus enlarging the molten zone in the furnace. On the other hand if new charge be added faster than it can be melted by the heat available from the current, the temperature of charge 14 will decrease and will fall to a point where it will begin to harden along the surface of contact between 14 and 15, thus decreasing the molten zone 14 and thickening the solidified inner wall 15. By regulating the rate of feeding in the new charge, the inner wall 14 can thus be maintained at any desired thickness.

In practice I have found that this principle is also susceptible of local application in the furnace. Experience has shown in the operation of electric smelting furnaces that the charge has a tendency to burn or melt through the walls at one spot or another as indicated by the dotted line at 16. The imminence of this condition is indicated by the glowing red color which appears on the outside of the walls at the point threatened. By feeding into the furnace new charge at this locality the temperature is lowered, the wall 16 re-forms, and the molten part of the charge 14 is reduced to the proper size. However, this dangerous condition rarely occurs when the correct temperature of the charge 14 is maintained by suitable regulation of the charge which I accomplish by the means described above.

I find that in operating the furnace in the manner described there is a gradual expansion of the outside of the walls 15 so that in time the firebrick 10 may fall away and only the then thickened wall 15 remains. As this may be built up at will on the inside, either as a whole or locally, the life of the furnace is unlimited in duration, and no expense is required for new linings or other repairs.

I have described the method of maintaining the desired thickness of furnace walls by maintaining a constant melting heat and varying or regulating the rate of feeding the charge which is the preferred mode of operation; but in some cases it may be desired to provide a constant rate of feeding the charge and to vary the intensity of the melting current, which arrangement also falls within the spirit of my invention. I desire it to be understood that although specific terms are employed they are used in a generic and descriptive sense and not for the purpose of limitation, the scope of the invention being defined by the appended claims.

I claim:

1. An improved method of constructing furnace walls, which consists in first melting and then cooling a portion of the charge whereby the cooled portion forms a solid continuous homogeneous crystalline heat-resisting wall about the center portion which provides a receptacle for the molten mass.

2. An improved method of constructing furnace walls, which consists in first melting and then cooling a portion of the charge whereby the cooled portion forms a solid continuous homogeneous crystalline heat-resisting wall about the center portion which provides a receptacle for the molten mass, said walls being maintained of the desired working thickness by controlling the rate of feeding the charge relative to the amount of heat applied.

In testimony whereof I affix my signature in presence of two witnesses.

CHARLES H. CHAPMAN.

Witnesses:
ROYAL D. TOMLINSON,
CHARLES LOCKWOOD.